Patented Aug. 16, 1932

1,872,080

UNITED STATES PATENT OFFICE

CLIFFORD GWILYM HARRIS, OF STOCKTON ON TEES, ENGLAND, ASSIGNOR TO IMPERIAL CHEMICAL INDUSTRIES LIMITED, OF LONDON, ENGLAND, A CORPORATION OF GREAT BRITAIN

SEPARATING GASES OR VAPORS

No Drawing. Application filed August 20, 1930, Serial No. 476,711, and in Great Britain October 24, 1929.

This invention relates to a method for separating gases from a gaseous mixture and more particularly to an improved method for separating olefines by adsorption.

It is known that substances of high molecular weight are more easily adsorbed than those of lower molecular weight and that the substances of higher molecular weight can displace the substances of lower molecular weight from the adsorbed state. Thus a porous material containing adsorbed benzene can be made to take up naphthalene vapors in replacement of benzene which is expelled. With respect to the separation of olefines, with which the present invention is particularly concerned, it is known that unsaturated hydrocarbons, e. g., ethylene, are absorbed by active carbon or the like and it has been proposed to separate olefines from coal gas by this method.

This invention has as an object an improved process of separating gases by adsorption. Another object is an improved process of this character which is of especial value in effecting a separation of olefines.

These objects are accomplished by the following invention in which the mixed gases are contacted with an adsorbent largely saturated with water vapor.

As illustrative of specific means for attaining the objects of the invention, a gaseous mixture as for instance a mixture of olefines or a gas mixture containing an olefine or olefines, is brought into contact with an adsorbent which is already largely saturated with a vapor or gas of affinity for the adsorbent intermediate between those of the substances which it is desired to separate. In this way the adsorptive capacity of the adsorbent i. e., the volume of gas taken up per unit volume of adsorbent, under these conditions is less than with the ordinary adsorbent, but it has been found nevertheless that the selective absorptive effect of the adsorbent is magnified since the constituent of lower affinity than the already present gas or vapor remains practically unabsorbed, whereas the constituent of higher affinity displaces the already present substance to some extent. Furthermore, when the saturated mass is treated for the recovery of the absorbed gases or vapors, a gas is obtained which contains the constituent of higher affinity in considerably greater proportion than the original mixture. A fractionation of unsaturated hydrocarbons is thus permitted, and the separate fraction recovered after one treatment can be subjected again to a similar process until substantially pure hydrocarbons are isolated, or if desired, further separation may be effected by the known practice of using an adsorbent containing no adsorbed gas.

The following is an example of my preferred method of effecting a separation of olefines in accordance with the present invention.

Oil gas containing 24 percent of ethylene, 17 percent of propylene and small amounts of higher olefines was passed through a tube packed with carbon at ordinary temperature, the carbon being charged with water vapor by saturation with steam at the boiling point and cooling prior to use. When the carbon so treated was saturated by the gases in the gaseous stream passed over it, a current of steam was led through the tube to expel the adsorbed gases. When the resulting gases were cooled and the water removed by condensation, a gas was obtained containing 85.5 percent of propylene and 3.5 percent of ethylene. The whole of the olefines may be extracted from the initial gas by placing a second tube filled with dry active carbon in series following the first tube containing the moist carbon.

The advantages of the present invention in effecting a more complete separation than is possible by the known practice is shown by the separation effected under the same conditions by the same adsorbent containing no adsorbed gas, as the water vapor in the foregoing example. Thus when the same gaseous mixture was passed over dry active carbon, the adsorptive capacity, i. e., the volume of gas taken up per unit volume of carbon, is greater than with the moist carbon, but when the gases are expelled from the saturated carbon, the gaseous mixture was found to contain 68 per cent of propylene and 15 per cent of ethylene. It will be seen, therefore, that a considerably higher concentration of propylene is obtained by the practice of the present invention.

As many apparently widely different embodiments of this invention may be made without departing from the spirit and scope thereof, it is to be understood that I do not limit myself to the specific embodiments thereof except as defined in the appended claims.

I claim:

1. A process for separating ethylene and propylene which comprises bringing the mixed gases into contact with carbon in which water vapor is adsorbed.

2. A process for separating ethylene and propylene which comprises bringing the mixed gases into contact with active carbon largely saturated with water vapor, expelling the adsorbed gas with steam, and cooling to condense and separate the water.

In testimony whereof, I affix my signature.

CLIFFORD GWILYM HARRIS.